H. C. Johnson,
Stovepipe Shelf,
No. 79,127. Patented June 23, 1868.
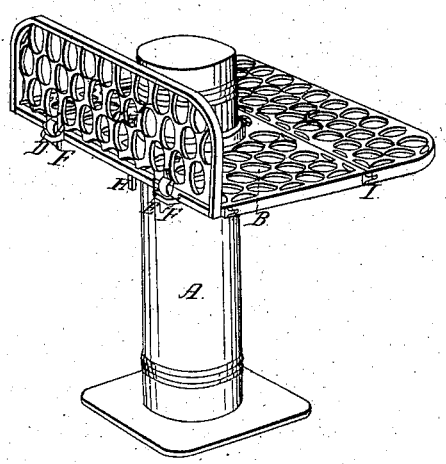
Fig 1.
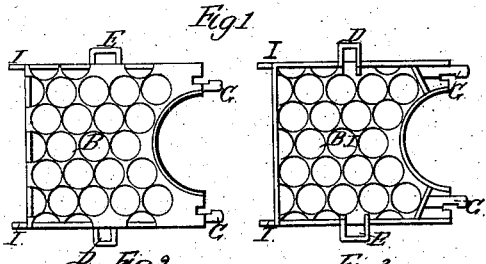
Fig 2. Fig 3.
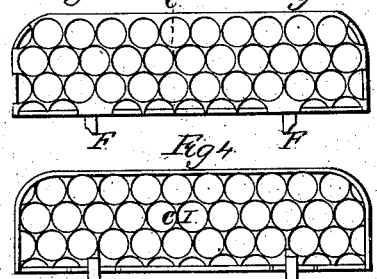
Fig 4.
Fig 5.
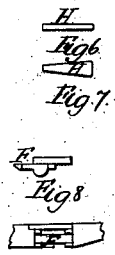
Fig 6.
Fig 7.
Fig 8.
Fig 9.
Witnesses:
Francis Beninghausen
L. F. Farwell
Inventor
H. C. Johnson
by J. B. Smith
his Atty

United States Patent Office.

H. C. JOHNSON, OF DELAVAN, WISCONSIN, ASSIGNOR TO HIMSELF AND C. H. JOHNSON, OF SAME PLACE.

*Letters Patent No. 79,127, dated June 23, 1868.*

STOVE-PIPE SHELF.

*The Schedule referred to in these Letters Patent and making part of the same.*

TO ALL WHOM IT MAY CONCERN:

Be it known that I, H. C. JOHNSON, of Delavan, county of Walworth, and State of Wisconsin, have invented a new and useful Improvement in Stove-Pipe Shelves; and I do hereby declare that the following is a full, clear, and exact description thereof, which will enable those skilled in the art to make and use the same, reference being had to the accompanying drawing, forming part of this specification, in which—

Figure 1 is a perspective view of the shelf attached to the stove-pipe, with one of the leaves turned up.
Figure 2, a top view of one end of the centre shelf.
Figure 3, a bottom view of the other end of the centre shelf.
Figure 4, a top view of one of the leaves.
Figure 5, a bottom view of the other leaf.
Figure 6, an edge view of one of the keys which hold the two parts of the centre shelf together.
Figure 7, flat view of same key.
Figure 8, view of one of the hooks on the leaves which secure them to the centre shelf.
Figure 9, view of one of the loops on the centre shelf, into which hook the hooks, fig. 8.
Similar letters of reference, in each of the figures, indicate corresponding parts.

The object of my invention is to provide a shelf, forming a table, with leaves, on which anything can be placed which it is desired to keep warm, and attaching the same to a stove-pipe.

I make this shelf of any suitable metal, and usually with interstices, to make it light and symmetrical.

A is a stove-pipe; B and B', the centre shelf, made of two pieces, as shown, figs. 2 and 3, with a collar, (projecting above and below its upper and lower face,) which encloses the pipe A, as shown, fig. 1. C and C', side leaves; D, narrow loops on the sides of the centre shelf; E, wide loops on the sides of the centre shelf. These loops are placed, one narrow and one wide, on each of the pieces B and B'. F, hooks on the leaves C and C'. These hooks, on their under sides, have a semicircle projection, which, when the leaves are turned up, as C' is shown in fig. 1, rests on the outside of the loops D and E, and, as the leaves are turned down, these projections turn on the loops, easing the leaves down, and preventing concussion. The points of the hooks F, passing under the centre shelf, form a support, which keeps the leaves in position, even, and on a plane with the centre shelf. G, hooks on the parts B and B' of the centre shelf, which, when the two parts are brought together, the point of each hook passes under the opposite piece B or B', forming a mortise on each side of the centre shelf, for a key to be driven, to hold the parts B and B' together, and make them hug the stove-pipe firmly. These hooks G, when the parts B and B' are together, have a leverage on the parts, which, when one end of the shelf is held, the other cannot fall or be pressed down, whilst, on lifting on the outer ends of B and B', they will double up together. H, keys, which, when driven into the mortise made by hooks G, hold the centre shelf B and B' firmly together. I, hooks on the corners of the centre shelf, on which to hang anything, as desired, and also to form a releaf should the stove-pipe be so large as to prevent the two parts B and B' from coming close together, in which case the leaves would not be long enough to come out flush with the ends of the pieces B and B'. That the leaves may not be cramped in such a case, one loop on each side of the centre shelf is wider than the hooks on the side of the leaves. These pieces B and B' are made both alike, as also the leaves C and C', so that, should any one get broken, any other one will fit in its place.

Operation: To put up the shelf, take one of the pieces B in one hand; place its recessed end against the stove-pipe; then take the other piece B in the other hand, and bring its recessed end to the other side of the stove-pipe, passing the hooks G under each piece B. Then let go with one hand, and with it put in the keys H, and drive them into the mortises made by hooks G, and the pieces B and B' will be made to hug the pipe A closely, and remain firmly in position. Then place the leaves C and C' one on each side, their hooks F passing into loops D and E, which will hold the leaves in position.

What I claim as my invention, and desire to secure by Letters Patent, is—

1. A stove-pipe shelf, when made in pieces B and B', with leaves C and C', secured to a stove-pipe, substantially as described.

2. Loops D and E, in combination with hooks F, to secure leaves C and C' to the centre shelf B and B', constructed as described, one loop being wide, and the other narrow, on each piece B, to provide for the parts B and B' being adjusted.

3. Forming hooks F straight on top, and with the semicircle projection on the bottom, as described, for the purpose of easing down the leaf, and holding it in place.

H. C. JOHNSON.

Witnesses:
  CHAS. E. GRIFFIN,
  J. W. LAWTON.